(12) United States Patent
Yamaguchi et al.

(10) Patent No.: US 7,075,728 B2
(45) Date of Patent: Jul. 11, 2006

(54) IMAGE-CAPTURING LENS AND IMAGE-CAPTURING APPARATUS

(75) Inventors: Susumu Yamaguchi, Hachioji (JP); Masae Sato, Machida (JP); Eigo Sano, Hino (JP)

(73) Assignee: Konica Minolta Opto, Inc., Tokyo (JP)

( * ) Notice: Subject to any disclaimer, the term of this patent is extended or adjusted under 35 U.S.C. 154(b) by 0 days.

(21) Appl. No.: 10/893,970

(22) Filed: Jul. 20, 2004

(65) Prior Publication Data

US 2005/0018314 A1   Jan. 27, 2005

(30) Foreign Application Priority Data

Oct. 23, 2000   (JP)   ............................. 2003-362650
Jul. 23, 2003   (JP)   ............................. 2003-200214
Sep. 24, 2003   (JP)   ............................. 2003-331611

(51) Int. Cl.
  *G02B 15/14*   (2006.01)
  *G02B 9/04*    (2006.01)
  *C08J 3/18*    (2006.01)

(52) U.S. Cl. ..................... 359/676; 359/793; 524/430
(58) Field of Classification Search ........ 359/676–692, 359/793–795; 524/425, 430
See application file for complete search history.

(56) References Cited

U.S. PATENT DOCUMENTS 5,329,402 A * 7/1994 Sato ........................... 359/691
5,734,508 A * 3/1998 Sato ........................... 359/687
6,759,452 B1* 7/2004 Border et al. ............... 523/223

* cited by examiner

*Primary Examiner*—Scott J. Sugarman
*Assistant Examiner*—M. Hasan
(74) *Attorney, Agent, or Firm*—Finnegan, Henderson, Farabow, Garrett & Dunner, L.L.P.

(57) ABSTRACT

An image-capturing lens includes a plastic lens formed with use of a material in which particles each having the maximum length of 30 nanometer or less are dispersed in a plastic material.

18 Claims, 4 Drawing Sheets

IMAGE-CAPTURING LENS AND IMAGE-CAPTURING APPARATUS

FIELD OF THE INVENTION

The present invention relates to an image-capturing lens of an image-capturing apparatus employing a solid image sensor such as an image sensor of a CCD (Charge Coupled Device) type or an image sensor of a CMOS (Complementary Metal-Oxide Semiconductor) type, and in particular, to an image-capturing lens wherein fluctuations in an image point position caused by temperature changes are small and to an image-capturing apparatus employing the image-capturing lens.

The present invention further relates to a zoom lens wherein fluctuations in an image point position caused by temperature changes are small in spite of a plastic lens and to an image-capturing apparatus employing the zoom lens.

RELATED ART

In recent years, a cellphone having a photographing function has been popularized rapidly, and under the influence of downsizing of an image-capturing apparatus using a solid image sensor such as an image sensor of a CCD type or an image sensor of a CMOS type which can be housed in the cellphone, demands for downsizing of an image-capturing lens to be housed have been increased. Therefore, a focal length of the total system of the image-capturing lens has been required to be small, which also has requested a radius of curvature and an outside diameter of each lens to be small, thus, it has become difficult for a glass lens manufactured through grinding and polishing to be processed, and a plastic lens which can be manufactured at low cost on a mass-production basis has come to be used. Patent Document 1 discloses a conventional example wherein all lenses constituting an image-capturing lens are plastic lenses.

(Patent Document 1) U.S. Pat. No. 3,396,683

However, the lens disclosed in the Patent Document 1 has a problem that a change in an image point position caused by a change of refractive index of plastic material resulted from temperature changes is relatively large. In the case of a small-sized image-capturing apparatus such as one housed in a cellphone, in particular, the so-called pan-focus system having no autofocusing mechanism of a lens is usually employed in many cases, and under such image-capturing apparatus, a change in an image point position caused by temperature changes cannot be ignored, which causes a fear of out-of-focus images in photographing under the severe temperature environment. For this problem, it is possible to provide an autofocusing mechanism on the image-capturing apparatus, which, however, incurs a fear of the essential problem that the cellphone becomes heavy and bulky to lose portability.

In view of the problems stated above, the first object of the invention is to provide an image-capturing lens wherein fluctuations in an image point position caused by temperature changes are small in spite of a plastic lens and an image-capturing apparatus employing that lens.

Further, in recent years, a digital camera employing a solid image sensor such as an image sensor of a CCD type or an image sensor of a CMOS type has been popularized rapidly. Under this condition, there are demands for a digital camera which is highly efficient and is low in price. For the high efficiency, the main trend is to improve aberration characteristics by using many glass mold aspheric lenses. However, the glass mold aspheric lens is difficult to be processed and is high in price, which causes a problem that a price of the zoom lens is extremely high. Therefore, plastic lenses manufactured at low cost on a mass-production basis have come to be used. Patent Document 1 discloses a conventional example wherein many plastic lenses are used.

(Patent Document 2) TOKKAI No. 2003-50352

However, the lens disclosed in Patent Document 2 has a problem that changes in a refractive index of plastic material are caused by changes of ambient temperatures, and a change in an image point position becomes large relatively, because many plastic materials are used. In contrast to this, in the digital camera employing a recent zoom lens, an autofocusing mechanism is usually housed. Therefore, it can be considered to use the autofocusing mechanism to drive the zoom lens to absorb changes of refractive index of the lens caused by temperature changes.

However, when setting the mode for fixing a focus to the hyperfocal distance without using autofocusing, or when driving a lens forcibly to any one of plural zoom positions determined in advance, like the so-called step zoom, if fluctuations of image point positions in the case of temperature changes are great, the mechanism to correct the fluctuations needs to be provided, thereby, a zoom mechanism needs to be complicated, which is a problem. Further, when using a plastic lens for a zoom lens, there have been various restrictions, including that the plastic lens cannot be used for the lens having a large refracting power, for reducing fluctuations of image point positions, or that the lens structure is determined in advance.

In view of the problems stated above, the second object of the invention is to provide a zoom lens wherein fluctuations in an image point position caused by temperature changes are small in spite of a plastic lens and an image-capturing apparatus employing that lens.

DISCLOSURE OF THE INVENTION

Since the image-capturing lens in Item 1-1 attaining the first object has a plastic lens formed by using the material wherein particles each having the maximum length of not more than 30 nanometers are dispersed, it is possible to provide an image-capturing lens having excellent optical characteristics in spite of environmental changes wherein fluctuations in image point positions are restrained, and light transmittance is not lowered, by dispersing particles each having the maximum length of not more than 30 nanometers in the plastic materials.

The zoom lens in Item 2-1 attaining the second object has a plastic lens formed by using the material wherein particles each having the maximum length of not more than 30 nanometers are dispersed in plastic material, in the zoom lens composed of plural lens groups wherein magnification is varied by changing a distance between the lens groups.

PREFERRED EMBODIMENT OF THE INVENTION

A basic concept of the invention will be explained first. In general, when fine powder is mixed with transparent resin material, light scattering is caused and transmittance is lowered, thus, it has been difficult to use them as optical materials. However, it has been cleared that light scattering can be prevented substantially, by making a size of fine power to be smaller than a wavelength of transmitted light flux.

Further, though a refractive index of a plastic material is lowered when a temperature of the plastic material rises, a refractive index of an inorganic particle is raised when a temperature of the inorganic particle rises. Therefore, it is possible to arrange so that refractive index changes are hardly caused, by utilizing these temperature-dependencies in a way that the temperature-dependencies offset each other. Specifically, it is possible to provide a material having totally an extremely low temperature-dependency, by dispersing, in plastic materials representing base materials, some inorganic particles whose maximum particle edge length is not more than 30 nanometers, preferably is not more than 20 nanometers, and more preferably is in a range of 10–15 nanometers.

For example, it is possible to make a change of refractive index for the temperature of this kind to be small, by dispersing fine-particles of niobium oxide ($Nb_2O_5$) in acrylic resins, and thereby to control effectively a change in an image point position resulting from temperature changes.

The preferred structure to attain the first object will be explained as follows.

Since the plastic lens formed by using materials wherein particles whose maximum particle edge length is not more than 30 nanometers are dispersed in plastic material is a positive plastic lens, it is possible to restrain effectively changes in image point position of an image-capturing lens which are caused by temperature changes, in the image-capturing lens in Item 1-2.

Since the image-capturing lens in Item 1-3 is composed of at least two lenses in the image-capturing lens in Item 1-1, it is possible to correct various aberrations properly, compared with an image-capturing lens of a single-piece structure, by making at least the image-capturing lens to be the image-capturing lens composed of two lenses.

Since the image-capturing lens in Item 1-4 has at least two plastic lenses in the image-capturing lens described in Item 1-1, and the plastic lens having the strongest refracting power among the plastic lenses is the plastic lens formed by using a material wherein particles whose maximum particle edge length is not more than 30 nanometers are dispersed in plastic material, it is possible to restrain more effectively the change in image point position of the image-capturing lens caused by the temperature changes.

The image-capturing lens in Item 1-5 has at least a positive lens and a negative lens in the image-capturing lens described in Item 1-1, and the positive plastic lens is a plastic lens formed by using a material wherein particles whose maximum particle edge length is not more than 30 nanometers are dispersed in plastic material. Since it is easy to add an aspheric surface to a plastic lens, it is possible to add easily an aspheric surface to a positive lens and a negative lens in the image-capturing lens, by providing an image-capturing lens having at least a positive lens and a negative lens, thus, various aberrations in the total system of the image-capturing lens can be corrected properly. Further, if the positive plastic lens is made to be a plastic lens formed by using a material wherein particles whose maximum particle edge length is not more than 30 nanometers are dispersed in plastic material, changes in image point positions of the image-capturing lens resulted from temperature changes can be restrained effectively, while correcting various aberrations of the total image-capturing lens system effectively.

The image-capturing lens of Item 1-6 is one wherein the image-capturing lens described in Item 1-1 is totally composed of plastic lenses, and at least one plastic lens is one formed by using a material wherein particles whose maximum particle edge length is not more than 30 nanometers are dispersed in plastic material. Therefore, by making all lenses constituting the image-capturing lens to be a plastic lens, it is possible to attain weight reduction compared with the image-capturing lens including a glass lens. Furthermore, if at least one lens is made to be a plastic lens formed by using a material wherein particles whose maximum particle edge length is not more than 30 nanometers are dispersed, changes in image point positions resulted from temperature changes in the total system of the image-capturing lens can be controlled.

The image-capturing lens of Item 1-7 is one wherein the image-capturing lens described in Item 1-1 includes at least one glass lens. The number of types of plastic materials used for lenses are less than those of glass materials, and refractive indexes and values of dispersion tend to be limited. Therefore, if at least one glass lens is included in the image-capturing lens, aberration corrections which are more excellent can be conducted, because the degree of freedom of selection for the refractive index and dispersion is increased.

The image-capturing lens of Item 1-8 is one according to the image-capturing lens described in any one of Item 1-1 to Item 1-7 wherein an aperture stop is provided, and at least one of a plastic lens that is closest to the aperture stop among plastic lenses and a plastic lens that is further adjacent to the plastic lens that is closest to the aperture stop is a plastic lens formed by using a material wherein particles whose maximum particle edge length is not more than 30 nanometers are dispersed in a plastic material, and therefore, it is possible to control effectively the changes in image point positions of the image-capturing lens resulted from temperature changes, by using such material for at least one of the plastic lens closest to the aperture stop and the plastic lens that is further adjacent to the aforesaid plastic lens closest to the aperture stop. Namely, when changes in refractive index resulted from temperature changes are caused on the lens near the aperture stop, changes in image point fluctuations are caused and optical efficiency of the total image-capturing lens is deteriorated. However, the deterioration of the optical efficiency can be controlled to be small, by using the aforesaid material. Since it is further possible to make a diameter of the lens near the aperture stop to be small, a lens that may be formed easily can be made even from a material wherein particles in a nanometer size are dispersed in a plastic material.

The image-capturing lens of Item 1-9 is represented by the image-capturing lens described in any one of Item 1-1 to Item 1-8 wherein the plastic lens formed by using a material wherein particles in size of 30 nanometers or less are dispersed satisfies the following condition;

$$|A|<8\times10^{-5}/°C. \quad (1)$$

wherein, A represents a change of refractive index caused by a temperature change which is expressed by the following expression.

$$A = \frac{(n^2+2)(n^2-1)}{6n}\left\{\left(-3\alpha + \frac{1}{[R]}\frac{\partial[R]}{\partial t}\right)\right\} \quad \text{(Numeral 1)}$$

a. α: Coefficient of linear expansion, [R]: Molecular refraction

The image-capturing lens of Item 1-10 is represented by the image-capturing lens described in Item 1-9, wherein the plastic lens formed by using a material wherein particles in size of 30 nanometers or less are dispersed satisfies the following condition;

$$|A|<6\times10^{-5}/°C. \quad (2)$$

Next, a change of refractive index caused by a temperature change will be explained. The change of refractive index caused by a temperature change A is expressed by the aforesaid Numeral 2 by differentiating refractive index n with temperature t based on Lorentz-Lorenz equation.

In the case of a plastic material, a contribution of the second term is generally small compared with the first term in the equation, and it can be ignored substantially. For example, in the case of PMMA resin, the coefficient of linear expansion α is $7\times10^{-5}$, and when it is substituted in the aforesaid expression, $A=-1.2\times10^{-4}/°C$. holds, which agrees substantially with an actual measurement.

In the invention, in this case, a contribution of the second term in the aforesaid expression is made to be great substantially by dispersing fine particles, preferably inorganic fine particles, in a plastic material, so that changes caused by linear expansion of the first term and those caused by the second term may cancel each other.

Specifically, it is preferable that the change of refractive index caused by a temperature change A which has been about $-1.2\times10^{-4}/°C$. in the past is controlled to be less than $8\times10^{-5}/°C$. on an absolute value basis. It is further preferable to control to be less than $6\times10^{-5}/°C$. on an absolute value basis. It is more preferable to control to be less than $4\times10^{-5}$ on an absolute value basis.

It is further possible to make a contribution of the second term to be greater so that there may be provided temperature characteristics which are opposite to those of the plastic material representing a base material. In other words, it is also possible to obtain a material whose refractive index is raised without being lowered when a temperature rises.

With respect to the rate of mixing, 80 is for the plastic material representing a base material and about 20 is for niobium oxide on a volume ratio basis, and these are mixed evenly. Though fine particles have a problem to tend to cohere, necessary state of dispersion can be obtained because there is known a technology to disperse by giving charges to the surface of each particle.

Incidentally, this volume ratio can be raised or lowered properly for controlling a rate of change of refractive index for temperatures, and plural types of inorganic particles in nanometer sizes can be blended and dispersed.

Table 1 shows changes of refractive index of plastic material applicable to the invention caused by a temperature change A (=dn/dT).

TABLE 1

| Plastic material | A (Approximate value) $10^{-5}/°C.$ |
|---|---|
| Acryl-based | −12 |
| Polycarbonate-based | −14 |
| Polyolefin-based | −12 |
| Polyester-based | −14 |

Table 2 shows changes of refractive index of inorganic material applicable to the invention caused by a temperature change A (=dn/dT) wherein a direction of a symbol is different from the plastic material

TABLE 2

| Inorganic material | A (Approximate value) $10^{-5}/°C.$ |
|---|---|
| Aluminum oxide | 1.4 |
| ALON | 1.2 |
| Beryllium oxide | 1.0 |
| Diamond | 1.0 |
| Calcium carbonate | 0.7 |
| Titanium potassium phosphate | 1.2 |
| Magnesium aluminate | 0.9 |
| Magnesium oxide | 1.9 |
| Quartz | 1.2 |
| Tellurium oxide | 0.9 |
| Yttrium oxide | 0.8 |
| Zinc oxide | 4.9 |

The image-capturing lens of Item 1-11 is represented by the image-capturing lens described in any one of Item 1-1 to Item 1-10, wherein the particles are inorganic materials.

The image-capturing lens of Item 1-12 is represented by the image-capturing lens described in Item 1-11, wherein the inorganic materials are oxides.

The image-capturing lens of Item 1-13 is represented by the image-capturing lens described in Item 1-12, wherein the oxides are in the state of saturated oxidation.

It is preferable that fine particles are an inorganic substance and it is more preferable that they are an oxide. Oxides which are saturated in terms of the state of oxidation and are not oxidized any more are preferable. Fine particle which is an inorganic substance is preferable because its reaction with a plastic material representing a high polymer organic compound can be controlled to be low, and its deterioration caused when it is used can be prevented when it is an oxide. Further, it is naturally possible to prevent oxidization of the plastic material by adding antioxidants.

The image-capturing lens of Item 1-14 is represented by the image-capturing lens described in any one of Item 1-1 to Item 1-13, wherein a volume ratio between the plastic material and the particles dispersed in the plastic material is within a range of 9:1–3:2.

Though the volume ratio is 80:20, namely, 4:1 in the aforesaid example, it can be adjusted properly within a range of 90:10 (9:1)–60:40 (3:2). If an amount of the particles is less, exceeding the ratio of 9:1, an effect to restrain a change by temperature turns out to be smaller, while, when the ratio of 3:2 is exceeded, there is caused a problem in moldability, which is not preferable. It is more preferable to adjust a degree of refractive index change in the material wherein fine particles are dispersed in a plastic material, by considering an influence on the total image-capturing lens by temperature changes.

The image-capturing lens of Item 1-15 has therein the image-capturing lens described in any one of Item 1-1 to Item 1-14.

The invention makes it possible to provide an image-capturing lens wherein a fluctuation of image point position in the case of temperature changes is small even when a plastic lens is used, and to provide an image-capturing apparatus employing the image-capturing lens.

Referring to the drawings, there will be explained in detail the embodiment of the invention for attaining the first object of the invention to which, however, the invention is not limited. Incidentally, "a plastic lens" in the invention includes a lens wherein a base material is a plastic material, and particles each being small in diameter are dispersed in the plastic material and a volume ratio of plastic is one half or more, and it also includes a lens whose surface is subjected to coating processing for the purpose of antireflection and an improvement of surface hardness.

Figure 1:
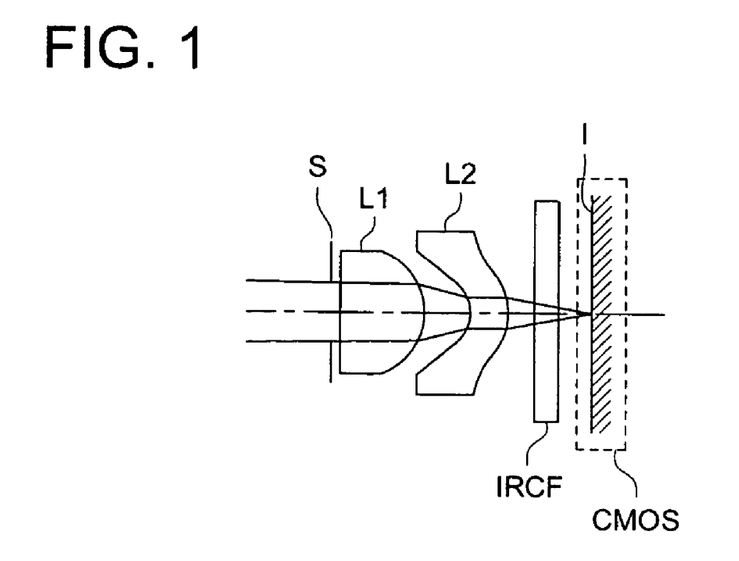
FIG. 1 is a schematic diagram of an image-capturing apparatus including an image-capturing lens.

FIG. 1 is a sectional view in the optical axis direction of an image-capturing apparatus including an image-capturing lens relating to the present embodiment. In FIG. 1, the image-capturing lens includes aperture stop S, first lens L1, second lens L2 and infrared cut filter IRCF in this order from the object side, and the image-capturing apparatus is composed of the image-capturing lens and of a solid-state image sensor such as image sensor CMOS arranged on the image side of the infrared cut filter IRCF. An optical image that is formed on image-capturing surface I by passing of light through the image-capturing lens is converted into electric signals by image sensor CMOS, and is further subjected to prescribed processing, to be converted into electric signals.

The first lens L1 adjoining the aperture stop S is a plastic lens that has the greatest refracting power and is formed by using a material wherein particles whose maximum particle edge length is not more than 30 nanometers are dispersed in a plastic material. The second lens L2 is a plastic lens containing no particles. However, there are considered other various structures in addition to the foregoing. Though the number of lenses is two in the present embodiment, three lenses or not less than four lenses may also be used, and in that case, one or both of the lens adjoining the aperture stop S and the lens adjoining the aforesaid lens may be made to be a plastic lens formed by using a material wherein particles whose maximum particle edge length is not more than 30 nanometers are dispersed.

Now, a preferred example in the present embodiment will be explained as follows. Symbols used in the example are as follows.

F: F-number

2Y: Length of diagonal line on image-capturing surface of solid-state image sensor (length of a diagonal line of the rectangular effective pixel area of solid-state image sensor)

R: Curvature radius of refractive surface

D: Distance between refractive surfaces on axis

Nd: Refractive index of lens material for d line at a normal temperature vd: Abbe's number of lens material f: Focal length fB: Back focus In the present embodiment, a shape of an aspheric surface is expressed by "Numeral 3", in the rectangular coordinates wherein the origin is represented by the vertex of the surface and the horizontal axis is represented by the optical axis direction, under the conditions that C represents the curvature of the vertex, K represents the conic constant and A4, A6, A8, A10 and A12 represent the aspheric surface coefficients.

$$X = \frac{Ch^2}{1+\sqrt{1-(1+K)C^2h^2}} + A_4h^4 + A_6h^6 + A_8h^8 + A_{10}h^{10} + A_{12}h^{12}$$ (Numeral 2)

wherein, $$h = \sqrt{Y^2 + Z^2}$$

Tables 3 and 4 show lens data related to the present embodiment. Incidentally, in the Tables, the exponentiation of 10 (for example, $2.5 \times 10^{-3}$) is to be expressed by using E (for example, 2.5×E-3).

TABLE 3

(Example 1)

f = 2.13 mm    fB = 0.41 mm    F = 2.88    2Y = 3.00 mm

| Surface No. | R(mm) | D(mm) | Nd | vd |
|---|---|---|---|---|
| Aperture | ∞ | 0.05 | | |
| 1 | 3.433 | 1.10 | 1.53175 | 56.0 |
| 2 | −0.774 | 0.59 | | |
| 3 | −0.347 | 0.50 | 1.58300 | 30.0 |
| 4 | −0.568 | 0.30 | | |
| 5 | ∞ | 0.30 | 1.51633 | 64.1 |
| 6 | ∞ | | | |

TABLE 4

| | Aspheric surface coefficient |
|---|---|
| First surface | K = 4.60380 × E+01 |
| | A4 = −4.84740 × E−01 |
| | A6 = 2.07620 × E+00 |
| | A8 = −3.83570 × E+01 |
| | A10 = 2.13660 × E+02 |
| | A12 = −5.45620 × E+02 |
| Second surface | K = −2.18110 × E−01 |
| | A4 = 1.85600 × E−01 |
| | A6 = −6.82460 × E−01 |
| | A8 = 1.55450 × E+00 |
| | A10 = −2.03740 × E+00 |
| | A12 = 9.69370 × E−01 |
| Third surface | K = −8.57310 × E−01 |
| | A4 = 1.21860 × E+00 |
| | A6 = −1.32960 × E+00 |
| | A8 = 6.34950 × E+00 |
| | A10 = −1.40400 × E+01 |
| | A12 = 1.23400 × E+01 |
| Fourth surface | K = −9.29500 × E−01 |
| | A4 = 4.97610 × E−01 |
| | A6 = −2.36140 × E−01 |
| | A8 = 6.61190 × E−01 |
| | A10 = −7.94890 × E−01 |
| | A12 = 3.27600 × E−01 |

FIRST EXAMPLE

The present example is a design example corresponding to the image-capturing lens in FIG. 1 wherein aperture stop S is arranged to be closest to an object, and infrared cut filter IRCF is arranged to be closest to an image. First lens L1 is a polyolefin-based plastic lens formed by using the material wherein particles each having a diameter of not more than 30 nanometers are dispersed in plastic material, and second lens L2 is a polycarbonate-based plastic lens containing no particles.

Changes of refractive index caused by temperatures are shown in Table 3. According to this, an amount of changes ($\Delta fB$) of back focus in the case of temperature rise of +30° C. from the normal temperature (20° C.) is +0.010 mm when $A=-8\times10^{-5}/°$ C. holds for the first lens L1, and it is +0.006 mm when $A=-6\times10^{-5}/°$ C. holds for the first lens L1, while, an amount of changes ($\Delta fB$) of back focus in the case of temperature fall of $-30°$ C. is $-0.010$ mm when $A=-8\times10^{-5}/°$ C. holds for the first lens L1, and it is $-0.006$ mm when $A=-6\times10^{-5}/°$ C. holds for the first lens L1.

TABLE 5

|  | $A[/° C.]$ | Refractive index at normal temperature | Refractive index at normal temperature + 30° C. | Refractive index at normal temperature − 30° C. |
| --- | --- | --- | --- | --- |
| First lens | $-8 \times 10^{-5}$ | 1.5318 | 1.5294 | 1.5342 |
|  | $-6 \times 10^{-5}$ |  | 1.5300 | 1.5336 |
| Second lens | $-14 \times 10^{-5}$ | 1.5830 | 1.5788 | 1.5872 |

SECOND EXAMPLE

Figure 2:
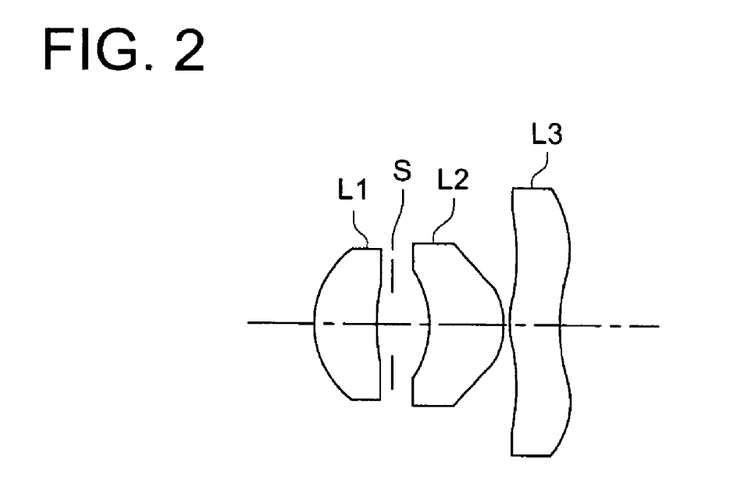
FIG. 2 is a sectional view of an image-capturing lens in Second Example.

FIG. 2 is a sectional view of an image-capturing lens of Second Example. Tables 6 and 7 show lens data related to the present example.

TABLE 6

(Example 2)

f = 3.812 mm    fB = 0.846 mm    F = 2.88    2Y = 4.61 mm

| Surface No. | R(mm) | D(mm) | Nd | νd |
| --- | --- | --- | --- | --- |
| 1 | 1.818 | 1.00 | 1.53180 | 56.0 |
| 2 | 3.713 | 0.25 |  |  |
| Aperture | ∞ | 0.62 |  |  |
| 3 | −1.687 | 1.22 | 1.53180 | 56.0 |
| 4 | −0.900 | 0.10 |  |  |
| 5 | 6.800 | 0.78 | 1.58300 | 30.0 |
| 6 | 1.534 |  |  |  |

TABLE 7

| First surface | K = 9.1572 × E−01 |
|  | A4 = −3.8570 × E−03 |
|  | A6 = 1.1925 × E−03 |
|  | A8 = 1.5434 × E−03 |
|  | A10 = −1.0585 × E−03 |
| Second surface | K = 1.9004 × E+01 |
|  | A4 = 1.4293 × E−03 |
|  | A6 = 6.6467 × E−02 |
|  | A8 = −1.0545 × E−01 |
|  | A10 = −2.1010 × E−02 |
| Third surface | K = −1.9422 × E−01 |
|  | A4 = −2.5670 × E−02 |
|  | A6 = −2.3520 × E−01 |
|  | A8 = 3.4025 × E−01 |
|  | A10 = −7.1481 × E−02 |
| Fourth surface | K = −2.8233 × E+00 |
|  | A4 = −2.1793 × E−01 |
|  | A6 = 1.3119 × E−01 |
|  | A8 = −8.5911 × E−02 |
|  | A10 = 2.6341 × E−02 |
|  | A12 = 6.5050 × E−04 |

TABLE 7-continued

| Fifth surface | K = −9.7657 × E+01 |
|  | A4 = −6.2544 × E−02 |
|  | A6 = 3.0029 × E−02 |
|  | A8 = −4.5729 × E−03 |
|  | A10 = −2.4190 × E−04 |
|  | A12 = 5.3660 × E−05 |
| Sixth surface | K = −1.0932 × E+01 |
|  | A4 = −6.9262 × E−02 |
|  | A6 = 1.6497 × E−02 |
|  | A8 = −1.8007 × E−03 |
|  | A10 = −1.6190 × E−05 |
|  | A12 = 1.1347 × E−06 |

The image-capturing lens in Second Example is a design example wherein aperture stop S is arranged between the first lens L1 and the second lens L2 as shown in FIG. 2. Each of the first lens L1 and the second lens L2 is a polyolefin-based plastic lens formed by using the material wherein particles whose maximum particle edge length is not more than 30 nanometers ate dispersed, and third lens L3 is a polycarbonate-based plastic lens containing no particles.

Changes of refractive index caused by temperatures are shown in Table 8. According to this, an amount of changes ($\Delta fB$) of back focus in the case of temperature rise of +30° C from the normal temperature (20° C.) is +0.014 mm when $A=-8\times10^{-5}/°$ C. holds for the first lens L1 and the second lens L2, and it is +0.008 mm when $A=-6\times10^{-5}/°$ C. holds for the first lens L1 and the second lens L2, while, an amount of changes ($\Delta fB$) of back focus in the case of temperature fall of $-30°$ C. is $-0.014$ mm when $A=-8\times10^{-5}/°$ C. holds for the first lens L1 and the second lens L2, and it is $-0.008$ mm when $A=-6\times10^{-5}/°$ C. holds for the first lens L1 and the second lens L2.

TABLE 8

|  | $A[/° C.]$ | Refractive index at normal temperature | Refractive index at normal temperature + 30° C. | Refractive index at normal temperature − 30° C. |
| --- | --- | --- | --- | --- |
| First lens | $-8 \times 10^{-5}$ | 1.5318 | 1.5294 | 1.5342 |
|  | $-6 \times 10^{-5}$ |  | 1.5300 | 1.5336 |
| Second lens | $-8 \times 10^{-5}$ | 1.5318 | 1.5294 | 1.5342 |
|  | $-6 \times 10^{-5}$ |  | 1.5300 | 1.5336 |
| Third lens | $-14 \times 10^{-5}$ | 1.5830 | 1.5788 | 1.5872 |

THIRD EXAMPLE

Figure 3:
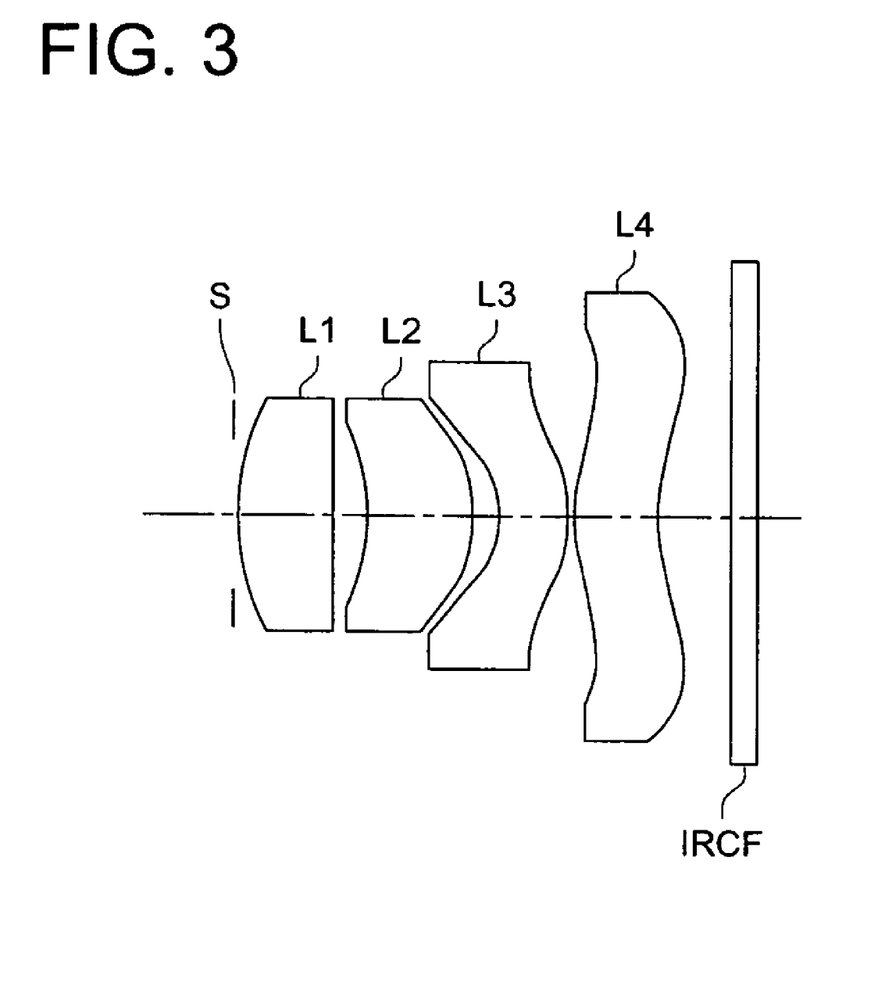
FIG. 3 is a sectional view of an image-capturing lens in Third Example.

FIG. 3 is a sectional view of an image-capturing lens of Third Example. Tables 9 and 10 show lens data related to the present example.

TABLE 9

(Example 3)

f = 5.309 mm    fB = 0.511 mm    F = 2.88    2Y = 6.48 mm

| Surface No. | R(mm) | D(mm) | Nd | νd |
| --- | --- | --- | --- | --- |
| Aperture | ∞ | 0.00 |  |  |
| 1 | 3.227 | 1.27 | 1.69680 | 55.5 |
| 2 | −87.050 | 0.44 |  |  |
| 3 | −3.364 | 1.40 | 1.52500 | 56.0 |
| 4 | −1.626 | 0.35 |  |  |
| 5 | −1.021 | 0.90 | 1.58300 | 30.0 |

TABLE 9-continued (Example 3)

| | | | | |
|---|---|---|---|---|
| 6 | −2.147 | 0.10 | | |
| 7 | 2.462 | 1.10 | 1.52500 | 56.0 |
| 8 | 2.283 | 1.00 | | |
| 9 | ∞ | 0.30 | 1.51633 | 64.1 |
| 10 | ∞ | | | |

TABLE 10

| | Aspheric surface coefficient |
|---|---|
| Third surface | K = −3.69470 × E+00 |
| | A4 = −2.00408 × E−02 |
| | A6 = 5.93561 × E−03 |
| | A8 = 5.22016 × E−04 |
| | A10 = −2.38137 × E−04 |
| Fourth surface | K = −8.46375 × E−01 |
| | A4 = −2.02564 × E−02 |
| | A6 = 1.62756 × E−02 |
| | A8 = −4.14965 × E−03 |
| | A10 = 6.66591 × E−04 |
| Fifth surface | K = −8.10560 × E−01 |
| | A4 = 6.31710 × E−02 |
| | A6 = 4.14530 × E−04 |
| | A8 = 4.30470 × E−03 |
| | A10 = −2.38210 × E−03 |
| | A12 = 3.81300 × E−04 |
| Sixth surface | K = −4.69690 × E−01 |
| | A4 = 1.50160 × E−02 |
| | A6 = 9.94400 × E−03 |
| | A8 = −2.33050 × E−03 |
| | A10 = 3.92580 × E−04 |
| | A12 = −2.86340 × E−05 |
| Seventh surface | K = −8.06986 × E+00 |
| | A4 = −1.22203 × E−02 |
| | A6 = −1.10253 × E−03 |
| | A8 = 2.97022 × E−04 |
| | A10 = −1.61617 × E−05 |
| | A12 = −1.33104 × E−06 |
| Eighth surface | K = −4.95420 × E+00 |
| | A4 = −1.49047 × E−02 |
| | A6 = 7.29589 × E−04 |
| | A8 = −2.84963 × E−04 |
| | A10 = 4.02284 × E−05 |
| | A12 = −2.14994 × E−06 |

The image-capturing lens in Third Example is a design example wherein aperture stop S is arranged to be closest to an object, and infrared cut filter IRCF is arranged to be closest to an image as shown in FIG. 3. The first lens L1 is a glass lens, the second lens L2 is a polyolefin-based plastic lens formed by using the material wherein particles whose maximum particle edge length is not more than 30 nanometers are dispersed in plastic material, third lens L3 is a polycarbonate-based plastic lens formed by using the material wherein particles whose maximum particle edge length is not more than 30 nanometers are dispersed in plastic material, and fourth lens L4 is polyolefin-based plastic lens containing no particles. Incidentally, the second lens L2 and the fourth lens L4 are polyolefin-based plastic lenses which are different from those in the First and Second Embodiments.

Changes of refractive index caused by temperatures are shown in Table 11. According to this, an amount of changes (ΔfB) of back focus in the case of temperature rise of +30° C. from the normal temperature (20° C.) is −0.002 mm when A=−8×10$^{-5}$/° C. holds for the second lens L2 and the third lens L3, and it is −0.001 mm when A=−6×10$^{-5}$/° C. holds for the second lens L2 and the third lens L3, while, an amount of changes (ΔfB) of back focus in the case of temperature fall of −30° C. is +0.002 mm when A=−8×10$^{-5}$/° C. holds for the second lens L2 and the third lens L3, and it is +0.001 mm when A=−6×10$^{-5}$/° C. holds for the second lens L2 and the third lens L3.

TABLE 11

| | A[/° C.] | Refractive index at normal temperature | Refractive index at normal temperature + 30° C. | Refractive index at normal temperature − 30° C. |
|---|---|---|---|---|
| Second lens | −8 × 10$^{-5}$ | 1.5250 | 1.5226 | 1.5274 |
| | −6 × 10$^{-5}$ | | 1.5232 | 1.5268 |
| Third lens | −8 × 10$^{-5}$ | 1.5830 | 1.5806 | 1.5854 |
| | −6 × 10$^{-5}$ | | 1.5812 | 1.5848 |
| Fourth lens | −12 × 10$^{-5}$ | 1.5250 | 1.5214 | 1.5286 |

In this case, the amount of changes (ΔfB) of back focus in the case of temperature rise is a value obtained by disregarding an influence of thermal expansion of the plastic lens in the case of temperature rise and an influence of thermal expansion of a lens barrel that holds the lens on the basis of calculation. The reason for the foregoing is that fluctuations in image point position in the case of temperature changes are mainly resulted from changes in the refractive index of the plastic lens.

If a value of A of each lens is made to be one that cancels the fluctuations of image point positions of the total system including also thermal expansions of the lens barrel and of plastic lenses, such structure is more preferable.

Incidentally, the image-capturing lens of the invention is especially effective for the image-capturing apparatus (image-capturing apparatus of the so-called pan-focus system) that houses therein a solid-state image sensor having many pixels and has no autofocusing mechanism. Namely, since the pixel pitch of the small-sized solid-state image sensor having many pixels is small, the focal depth (generally, a value obtained through calculation of "± (pixel pitch)×2× (F-number of image-capturing lens)") that is proportional to the pixel pitch is small, resulting in a narrow permissible range for fluctuations of image point positions in the case of temperature changes. The image-capturing apparatus of the pan-focus system is originally of the system to focus on an object at the hyperfocal distance and thereby to cover a range from the infinity to the closest distance with the depth of field. Therefore, image quality for an object at the infinity or at the closest distance is somewhat out of focus, compared with image quality of an object at the hyperfocal distance, and therefore, image quality for the infinity or the closest distance is extremely deteriorated when fluctuations are caused in the case of temperature changes, which is not preferable.

Incidentally, First Example is an example of the image-capturing lens for the solid-state image sensor of a ⅙ inch type with about 300,000 pixels at a pixel pitch of 3.75 μm. Second Example is an example of the image-capturing lens for the solid-state image sensor of a ¼ inch type with about 1,000,000 pixels at a pixel pitch of 3.2 μm, and Third Example is an example of the image-capturing lens for the solid-state image sensor of a 1/2.7 inch type with about 1,000,000 pixels at a pixel pitch of 4.5 μm.

Next, the preferred structure to attain the second object will be explained as follows.

Since the plastic lens formed by using materials wherein particles whose maximum particle edge length is not more than 30 nanometers are dispersed in plastic material is a plastic lens having the positive refracting power in the zoom lens described in Item 2-1, it is possible to restrain effectively the changes in image point positions of the zoom lens which are caused by temperature changes by forming the positive plastic lens by using materials wherein particles whose maximum particle edge length is not more than 30 nanometers are dispersed, in the zoom lens in Item 2-2.

Since the zoom lens has at least two plastic lenses in the zoom lens described in Item 2-1, and the plastic lens having the strongest refracting power among the plastic lenses is a plastic lens formed by using a material wherein particles whose maximum particle edge length is not more than 30 nanometers are dispersed in plastic material, it is possible to restrain effectively the changes in image point positions of the zoom lens caused by the temperature changes, by forming the plastic lens having the strongest refractive index by using a material wherein particles whose maximum particle edge length is not more than 30 nanometers are dispersed, in the zoom lens of Item 2-3.

In the zoom lens described in Item 2-1, the zoom lens described in Item 2-1 has at least two plastic lenses, and when hi (i=1, . . . ) represents a height at which a paraxial marginal ray of light in the case of full aperture passes on the surface of each plastic lens on the object side and $\Phi_p i$ (i=1, . . . ) represents the refracting power of each plastic lens, the plastic lens that makes an absolute value of hi×$\Phi_p i$ (i=1, . . . ) to be the maximum value in an optional focal length in the case of magnification change from the wide-angle end to the telephoto end in the optional focal length, is a plastic lens formed by using a material wherein particles whose maximum particle edge length is not more than 30 nanometers are dispersed in a plastic material.

When the ray of light is transmitted through the lens, the greater the product of a height of the ray of light and the refracting power is, the more the ray of light is deflected, and an influence of changes in refractive index in the case of temperature changes grows greater. Therefore, on the surface of each plastic lens closer to an object, and when hi (i=1, . . . ) represents a height at which a paraxial marginal ray of light in the case of full aperture passes on the surface of each plastic lens on the object side and $\Phi_p i$ (i=1, . . . ) represents the refracting power of each plastic lens, it is possible to restrain effectively fluctuations in image point positions of the zoom lens caused by temperature changes, by forming the plastic lens that makes an absolute value of hi×$\Phi_p i$ (i=1, . . . ) to be the maximum in an optional focal length in the case of magnification change from the wide-angle end to the telephoto end in the optional focal length, by using a material wherein particles whose maximum particle edge length is not more than 30 nanometers are dispersed in a plastic material.

The zoom lens in Item 2-5 has at least a plastic lens having the positive refracting power and a plastic lens having the negative refracting power in the zoom lens described in Item 2-4. Since it is easy to add an aspheric surface to a plastic lens, when making a zoom lens having at least a plastic lens having the positive refracting power and a plastic lens having the negative refracting power, it is possible to add easily an aspheric surface to each lens and thus, various aberrations in the total system of the zoom lens can be corrected properly.

With respect to the zoom lens of Item 2-6, the first lens group of the zoom lens closest to an object, in the zoom lens described in any one of Item 2-1 to Item 2-5 has at least one plastic lens, and the plastic lens is one formed by using the material wherein particles each having the maximum length of not more than 30 nanometers are dispersed in plastic material, thus, it is possible to prevent that an influence of fluctuations in image point positions of the zoom lens caused by temperature changes is enlarged by the magnifications of the lens groups which succeed the first lens group, by using, in the first lens group of the zoom lens closest to an object, a plastic lens formed by using the material wherein particles each having the maximum length of not more than 30 nanometers are dispersed in plastic material.

With respect to the zoom lens of Item 2-7, in the zoom lens described in any one of Item 2-1 to Item 2-6, the aforesaid zoom lens has an aperture stop, and at least one of the plastic lens adjoining the aperture stop to be closest to it among the plastic lenses, and the plastic lens adjoining further the plastic lens closest to the aperture stop is a plastic lens formed by using the material wherein particles each having the maximum length of not more than 30 nanometers are dispersed in plastic material, thus, it is possible to control effectively the fluctuations of image point positions of the zoom lens resulted from temperature changes, by using the material wherein particles each having the maximum length of not more than 30 nanometers are dispersed in plastic material for at least one of the plastic lens adjoining the aperture stop to be closest to it and the plastic lens adjoining further the aforesaid plastic lens.

Namely, when there are caused refractive index fluctuations resulted from temperature changes on a lens near the aperture stop, image point positions are fluctuated and optical efficiencies of the total zoom lens are deteriorated. By using the material mentioned above, however, the deterioration of the optical efficiencies can be controlled to be small. Further, the lens near the aperture stop can be made small to change into a lens that can easily be formed despite a material wherein particles in a nanometer size are dispersed in a plastic material.

With respect to the zoom lens of Item 2-8, the plastic lens formed by using a material wherein particles in a size of not more than 30 nanometers are dispersed satisfies the following condition, in the zoom lens described in any one Item 2-1 to Item 2-7;

$$|A|<8\times10^{-5}/°\ C. \tag{1}$$

wherein, A represents a refractive index change with temperatures whose value is shown by the (Numeral 1) stated above.

With respect to the zoom lens of Item 2-9, the plastic lens formed by using a material wherein particles in a size of not more than 30 nanometers are dispersed satisfies the following condition, in the zoom lens described in Item 2-8.

$$|A|<6\times10^{-5}/°\ C. \tag{2}$$

With respect to the zoom lens of Item 2-10, the aforesaid zoom lens has at least two plastic lenses each being formed by using the material wherein particles each having the maximum length of not more than 30 nanometers are dispersed in plastic material, and the plastic lenses formed by using the material stated above include plastic lenses each having a different value of refractive index change with temperature A. By using the plastic lens formed by using a material wherein particles each having the maximum length of not more than 30 nanometers are dispersed in plastic material having each different value of refractive index change with temperature A, it becomes possible to give properly a value of A that reduces fluctuations in image point positions resulted most as the total zoom lens from temperature changes, by considering a size of contribution of fluctuations in image point positions caused by temperature changes of each lens constituting the zoom lens.

The zoom lens of Item 2-11 is represented by the zoom lens described in any one of Item 2-1 to Item 2-10, wherein the particles are inorganic materials.

The zoom lens of Item 2-12 is represented by the zoom lens described in Item 2-11, wherein the inorganic materials are oxides.

The zoom lens of Item 2-13 is represented by the zoom lens described in Item 2-12, wherein the oxides are in the state of saturated oxidation.

The zoom lens of Item 2-14 is represented by the zoom lens described in any one of Item 2-1 to Item 2-13, wherein a volume ratio between the plastic material and the particles dispersed in the plastic material is within a range of 9:1–3:2.

Though the volume ratio is 80:20, namely, 4:1 in the aforesaid example, it can be adjusted properly within a range of 90:10 (9:1)–60:40 (3:2). If an amount of the particles is less, exceeding the ratio of 9:1, an effect to restrain a change by temperature turns out to be smaller, while, when the ratio of 3:2 is exceeded, there is caused a problem in moldability, which is not preferable. It is more preferable to adjust a degree of refractive index change in the material wherein fine particles are dispersed in a plastic material, by considering an influence on the total zoom lens by temperature changes.

The image-capturing apparatus of Item 2-15 has therein the zoom lens described in any one of Item 2-1 to Item 2-14.

Referring to the drawings, there will be explained in detail the embodiment of the invention for attaining the second object of the invention to which, however, the invention is not limited.

A target of the invention is to control fluctuations in image point positions of a zoom lens resulted from temperature changes to be within the focal depth of the zoom lens (generally, a value calculated by (±(pixel pitch)×2×(F-number of image-capturing lens))). By doing this, it is not necessary to provide a complicated mechanism to sense the then temperature by a temperature sensor and to correct the point of focusing with a stepping motor by an amount of fluctuation of image point position at the time of that temperature, in the case of the mode wherein no autofocusing is used and a focus is fixed at the hyperfocal distance, which makes downsizing and weight reduction of the total image-capturing apparatus possible.

Figure 4:
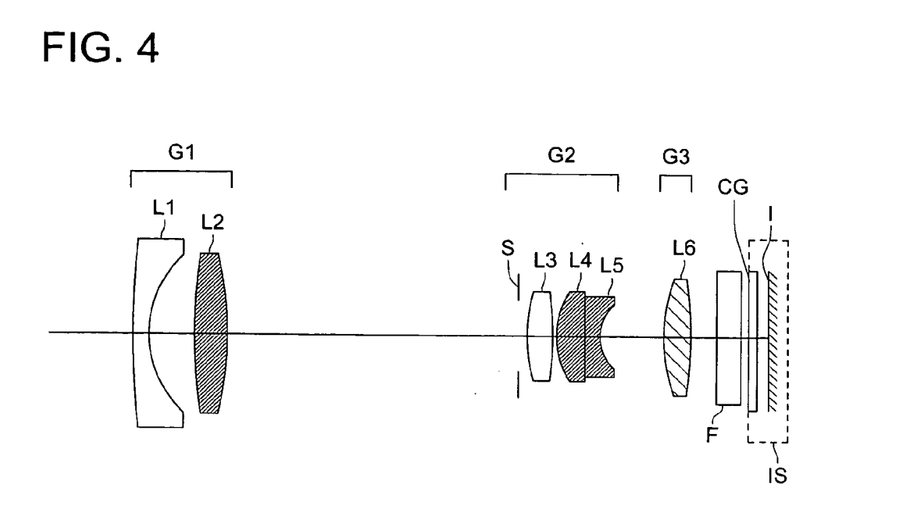
FIG. 4 is a sectional view in the optical axis direction of an image-capturing apparatus including a zoom lens in each of Fourth Example and Fifth Example.

FIG. 4 is a sectional view in the optical axis direction of an image-capturing apparatus including zoom lenses in Examples 4 and 5. In FIG. 4, the zoom lens includes, in the order from the part of an object, first lens L1, second lens L2, aperture stop S, third lens L3, fourth lens L4, fifth lens L5 and sixth lens L6 (L1–L2 constitute first lens group G1, S-L5 constitute second lens group G2 and L6 constitutes third lens group G3), and this zoom lens, optical filter F composed of an infrared cut filter arranged on the zoom lens to be closer to an object and of a lowpass filter, and solid-state image sensor IS such as CMOS or CCD constitute an image-capturing apparatus. An optical image that is formed on image-capturing surface I by passing of light through the zoom lens and filter F, and through cover glass of solid-state image sensor IS (parallel flat plate) CG is subjected to photoelectric conversion by the solid-state image sensor IS and is further subjected to prescribed processing to be converted into image signals.

Now, the preferred example for the present embodiment will be explained as follows. Incidentally, in all examples which will be described later, a solid-state image sensor of a 1/3.2 inch type having a pixel pitch of 2.8 μm and 2,000,000 pixels is used, and a zoom lens with F-number of about 2.88 at the wide-angle end and about 5.0 at the telephoto end is assumed.

Symbols used for respective examples are as follows.
f: Focal length of the total zoom lens
F: F-number
2Y: Length of diagonal line of rectangular effective pixel area of image-capturing surface of solid-state image sensor
R: Curvature radius of refractive surface
D: Distance between refractive surfaces on axis
Nd: Refractive index of lens material for d line at a normal temperature
vd: Abbe's number of lens material Further, "*" in the Surface No. represents an aspheric surface that is shown by the following "Numeral 3" under the condition that the origin is represented by the vertex of the surface and the horizontal axis is taken in the optical axis direction, and h represents a height in the direction perpendicular to the optical axis;

$$X = \frac{h^2/R}{1 + \sqrt{1-(1+K)h^2/R^2}} + \sum A_i h^i \qquad \text{(Numeral 3)}$$

wherein, symbols are as follows.
Ai: $i^{th}$ order aspheric surface coefficient
R: Radius of curvature
K: Conic constant

EXAMPLE 4

Lens data of a zoom lens in Example 4 are shown in Table 12. Incidentally, from now on, the exponentiation of 10 (for example, $2.5 \times 10^{-3}$) is to be expressed by using E (for example, 2.5×E-3).

TABLE 12

(Example 4, Example 5)

f = 4.78 to 13.68 mm    F = 2.88 to 4.92    2Y = 5.60 mm

| Surface No. | R(mm) | D(mm) | Nd | vd |
|---|---|---|---|---|
| 1 | 46.492 | 0.80 | 1.77250 | 49.6 |
| 2 | 5.832 | 2.74 | | |
| 3* | 39.262 | 1.95 | 1.60700 | 27.0 |
| 4* | −29.352 | (Variable) | | |
| Aperture | ∞ | 0.40 | | |
| 5 | 7.593 | 1.60 | 1.58913 | 61.2 |
| 6 | −20.071 | 0.20 | | |
| 7* | 4.138 | 1.73 | 1.49700 | 56.0 |
| 8 | 36.672 | 0.90 | 1.60700 | 27.0 |
| 9* | 2.671 | (Variable) | | |
| 10 | 12.124 | 1.60 | 1.52500 | 56.0 |
| 11* | −23.122 | (Variable) | | |
| 12 | ∞ | 1.46 | 1.54880 | 67.0 |
| 13 | ∞ | 0.40 | | |
| 14 | ∞ | 0.50 | 1.51633 | 64.1 |
| 15 | ∞ | | | |

| Variable distance | | | |
|---|---|---|---|
| f | 4.78 | 8.10 | 13.68 |
| D4 | 17.39 | 7.13 | 1.40 |
| D9 | 3.80 | 6.82 | 12.47 |
| D11 | 1.40 | 1.60 | 1.55 |

TABLE 12-continued (Example 4, Example 5)

| | Aspheric surface coefficient |
|---|---|
| Third surface | K = 1.60490 × E+00 |
| | A4 = −5.67770 × E−05 |
| | A6 = −4.19810 × E−06 |
| | A8 = 6.83470 × E−07 |
| | A10 = −1.83210 × E−08 |
| | A12 = 2.97430 × E−10 |
| Fourth surface | K = −2.79810 × E+00 |
| | A4 = −4.99660 × E−04 |
| | A6 = 5.87250 × E−06 |
| | A8 = −6.08080 × E−07 |
| | A10 = 2.92670 × E−08 |
| | A12 = −7.05600 × E−10 |
| Seventh surface | K = −8.35590 × E−01 |
| | A4 = 4.91930 × E−04 |
| | A6 = −1.19680 × E−05 |
| | A8 = −4.67250 × E−06 |
| | A10 = 2.54980 × E−07 |
| Ninth surface | K = −5.17430 × E−01 |
| | A4 = 1.57740 × E−03 |
| | A6 = 6.18060 × E−05 |
| | A8 = −3.41710 × E−05 |
| | A10 = 2.24810 × E−06 |
| Eleventh surface | K = −2.67400 × E+01 |
| | A4 = −2.78870 × E−04 |
| | A6 = 9.59510 × E−06 |
| | A8 = −2.96570 × E−06 |
| | A10 = 1.82460 × E−07 |

*Aspheric surface

In FIG. 4, a polyester-based plastic lens that is formed by using the material wherein particles each having the maximum length of not more than 30 nanometers are dispersed in plastic material and has refractive index change with temperature $A=-6\times10^{-5}$ is used, as the second lens L2, an acryl-based plastic lens that is formed by using the material wherein particles each having the maximum length of not more than 30 nanometers are dispersed in plastic material and has refractive index change with temperature $A=-6\times10^{-5}$ is used, as the fourth lens L4, a polyester-based plastic lens that is formed by using the material wherein particles each having the maximum length of not more than 30 nanometers are dispersed in plastic material and has refractive index change with temperature $A=-8\times10^{-5}$ is used, as the fifth lens L5, an polyolefin-based plastic lens containing no particles is used as the sixth lens L6, and a glass lens is used as each of lens L1 and lens L3 other than the foregoing.

In the present example, an absolute value of the product of height hi where axial marginal ray in the case of an open aperture on the surface of the plastic lens closer to an object passes and refracting power of the plastic lens Φpi is maximum in the fifth lens L5, and this fifth lens L5 is made to be a plastic lens formed by using the material wherein particles each having the maximum length of not more than 30 nanometers are dispersed in plastic material. Further, an absolute value of hi×Φpi at that time is 0.695.

Changes of refractive index nd by temperature changes are shown in Table 13. Further, Table 14 shows an amount of changes (Δ: fBw, ΔfBT) of back focus of each of the wide-angle end and the telephoto end in the case of temperature rise of +30° C. for the normal temperature (20° C.) and an amount of changes (ΔfBw, ΔfBT) of back focus of each of the wide-angle end and the telephoto end in the case of temperature fall of −30° C.

TABLE 13

| | A[/° C.] | Refractive index at normal temperature | Refractive index at normal temperature + 30° C. | Refractive index at normal temperature − 30° C. |
|---|---|---|---|---|
| * Second lens | −6 × 10⁻⁵ | 1.6070 | 1.6052 | 1.6088 |
| * Fourth lens | −6 × 10⁻⁵ | 1.4970 | 1.4952 | 1.4988 |
| * Fifth lens | −8 × 10⁻⁵ | 1.6070 | 1.6046 | 1.6094 |
| Sixth lens | −12 × 10⁻⁵ | 1.5250 | 1.5214 | 1.5286 |

* Plastic lens formed by using the material wherein particles whose maximum particle edge length is not more than 30 nanometers are dispersed

TABLE 14

| +30° C. | | −30° C. | |
|---|---|---|---|
| ΔfBw[mm] | ΔfBT[mm] | ΔfBw[mm] | ΔfBT[mm] |
| +0.008 | +0.024 | −0.008 | −0.024 |

Now, for the purpose of comparison, Table 15 and Table 16 show changes of refractive index nd by temperature changes in the case where all plastic lenses are made to be a plastic lens that does not contain the aforesaid particles, an amount of changes (ΔfBw, ΔfBT) of back focus of each of the wide-angle end and the telephoto end in the case of temperature rise of +30° C. for the normal temperature (20° C.), and an amount of changes (ΔfBw, ΔfBT) of back focus of each of the wide-angle end and the telephoto end in the case of temperature fall of −30° C.

TABLE 15

| | A[/° C.] | Refractive index at normal temperature | Refractive index at normal temperature + 30° C. | Refractive index at normal temperature − 30° C. |
|---|---|---|---|---|
| Second lens | −14 × 10⁻⁵ | 1.6070 | 1.6027 | 1.6113 |
| Fourth lens | −12 × 10⁻⁵ | 1.4970 | 1.4934 | 1.5006 |
| Fifth lens | −14 × 10⁻⁵ | 1.6070 | 1.6027 | 1.6113 |
| Sixth lens | −12 × 10⁻⁵ | 1.5250 | 1.5214 | 1.5286 |

TABLE 16

| +30° C. | | −30° C. | |
|---|---|---|---|
| ΔfBw[mm] | ΔfBT[mm] | ΔfBw[mm] | ΔfBT[mm] |
| +0.021 | +0.090 | −0.021 | −0.090 |

When Table 14 is compared with Table 16, it is understood that ΔfBw and ΔfBT in the present example are reduced sharply to be controlled within a focal depth.

EXAMPLE 5

Forms and arrangements of respective optical factors in the zoom lens in Example 5 are exactly the same as those in Example 4 (see FIG. 4), and lens data for them are the same as those shown in Table 12 accordingly. However, a difference is in a material of the plastic lens formed by using the material wherein particles each having the maximum length of not more than 30 nanometers are dispersed in plastic material.

More specifically, a polyester-based plastic lens that is formed by using the material wherein particles each having the maximum length of not more than 30 nanometers are dispersed in plastic material and has refractive index change with temperature $A=-4\times10^{-5}$ is used as the second lens L2, an acryl-based plastic lens that is formed by using the material wherein particles each having the maximum length of not more than 30 nanometers are dispersed in plastic material and has refractive index change with temperature $A=-4\times10^{-5}$ is used as the fourth lens L4, a polyester-based plastic lens that is formed by using the material wherein particles each having the maximum length of not more than 30 nanometers are dispersed in plastic material and has refractive index change with temperature $A=-6\times10^{-5}$ is used as the fifth lens L5, an polyolefin-based plastic lens containing no particles is used as the sixth lens L6, and a glass lens is used as each of lens L1 and lens L3 other than the foregoing.

In the present example, an absolute value of the product of height hi where axial marginal ray in the case of an open aperture on the surface of the plastic lens closer to an object passes and refracting power of the plastic lens Φpi is maximum in the fifth lens L5, and this fifth lens L5 is made to be a plastic lens formed by using the material wherein particles each having the maximum length of not more than 30 nanometers are dispersed in plastic material. Further, an absolute value of hi×Φpi at that time is 0.695.

Changes of refractive index nd by temperature changes are shown in Table 17. Further, Table 18 shows an amount of changes (ΔfBw, ΔfBT) of back focus of each of the wide-angle end and the telephoto end in the case of temperature rise of +30° C. for the normal temperature (20° C.) and an amount of changes (ΔfBw, ΔfBT) of back focus of each of the wide-angle end and the telephoto end in the case of temperature fall of −30° C.

TABLE 17

|  | A[/° C.] | Refractive index at normal temperature | Refractive index at normal temperature + 30° C. | Refractive index at normal temperature − 30° C. |
| --- | --- | --- | --- | --- |
| * Second lens | −4 × 10⁻⁵ | 1.6070 | 1.6058 | 1.6082 |
| * Fourth lens | −4 × 10⁻⁵ | 1.4970 | 1.4958 | 1.4982 |
| * Fifth lens | −6 × 10⁻⁵ | 1.6070 | 1.6052 | 1.6088 |
| Sixth lens | −12 × 10⁻⁵ | 1.5250 | 1.5214 | 1.5286 |

* Plastic lens formed by using the material wherein particles whose maximum particle edge length is not more than 30 nanometers are dispersed

TABLE 18

| +30° C. | | −30° C. | |
| --- | --- | --- | --- |
| ΔfBw[mm] | ΔfBT[mm] | ΔfBw[mm] | ΔfBT[mm] |
| +0.003 | +0.005 | −0.003 | −0.005 |

When Table 16 is compared with Table 18, it is understood that ΔfBw and ΔfBT in the present example are reduced sharply to be controlled within a focal depth. It is understood that ΔfBT is especially corrected properly.

EXAMPLE 6

Lens data of a zoom lens in Example 6 are shown in Table 19.

TABLE 19

| (Example 6, Example 7) | | | | |
| --- | --- | --- | --- | --- |
| f = 5.10 to 14.73 mm | | F = 2.88 to 5.03 | 2Y = 5.60 mm | |
| Surface No. | R(mm) | D(mm) | Nd | νd |
| 1 | 36.264 | 0.80 | 1.83481 | 42.7 |
| 2 | 5.784 | 2.20 | | |
| 3* | 33.971 | 1.00 | 1.49700 | 56.0 |
| 4 | 14.450 | 1.80 | 1.60700 | 27.0 |
| 5* | −41.485 | (Variable) | | |
| Aperture | ∞ | 0.35 | | |
| 6 | 10.975 | 1.50 | 1.58913 | 61.2 |
| 7 | −21.312 | 0.20 | | |
| 8* | 4.227 | 2.10 | 1.52500 | 56.0 |
| 9 | −20.068 | 0.20 | | |
| 10 | −38.713 | 0.90 | 1.60700 | 27.0 |
| 11* | 2.889 | (Variable) | | |
| 12 | 15.309 | 1.65 | 1.52500 | 56.0 |
| 13* | −15.080 | (Variable) | | |
| 14 | ∞ | 1.15 | 1.54880 | 67.0 |
| 15 | ∞ | 0.40 | | |
| 16 | ∞ | 0.50 | 1.51633 | 64.1 |
| 17 | ∞ | | | |

| Variable distance | | | |
| --- | --- | --- | --- |
| f | 5.10 | 8.63 | 14.73 |
| D5 | 13.80 | 5.83 | 1.00 |
| D11 | 3.35 | 7.19 | 13.64 |
| D13 | 1.80 | 1.73 | 1.70 |

| Aspheric surface coefficient | |
| --- | --- |
| Third surface | K = 1.84050 × E+00 |
| | A4 = 1.72910 × E−04 |
| | A6 = −3.12330 × E−05 |
| | A8 = 2.71810 × E−06 |
| | A10 = −2.00580 × E−08 |
| | A12 = −1.56340 × E−09 |
| Fifth surface | K = −4.36820 × E+00 |
| | A4 = −3.40010 × E−04 |
| | A6 = −1.82940 × E−05 |
| | A8 = 1.82810 × E−06 |
| | A10 = −3.44330 × E−08 |
| | A12 = −1.21030 × E−09 |
| Eighth surface | K = −4.14420 × E+00 |
| | A4 = 6.23680 × E−03 |
| | A6 = −4.36780 × E−04 |
| | A8 = 3.47470 × E−05 |
| | A10 = −1.52680 × E−06 |
| Eleventh surface | K = −1.75020 × E+00 |
| | A4 = 9.18890 × E−03 |
| | A6 = 3.62270 × E−05 |
| | A8 = −8.43350 × E−06 |
| | A10 = 2.19960 × E−06 |
| Thirteenth surface | K = 2.02380 × E+00 |
| | A4 = 2.03460 × E−04 |
| | A6 = −1.78390 × E−05 |
| | A8 = 1.18680 × E−06 |
| | A10 = −4.47980 × E−08 |

*Aspheric surface

Figure 5:
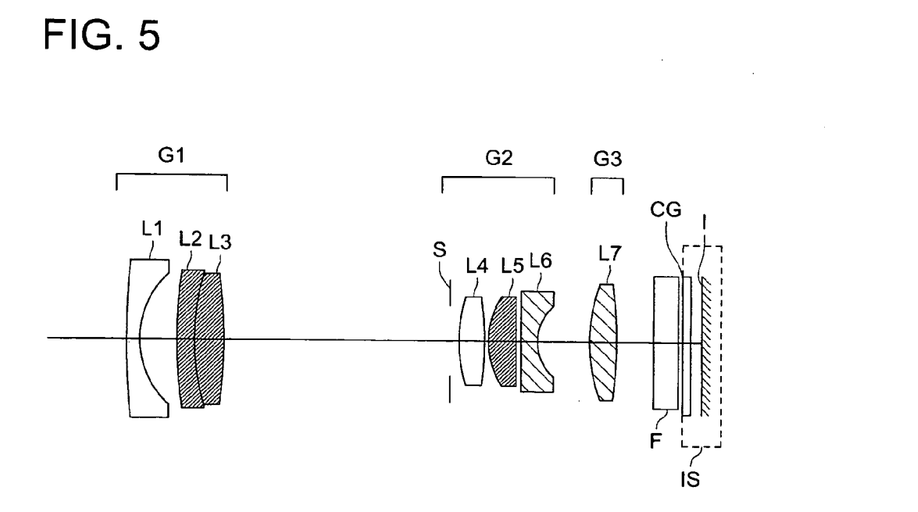
FIG. 5 is a sectional view in the optical axis direction of an image-capturing apparatus including a zoom lens in Sixth Example.

FIG. 5 is a sectional view in the optical axis direction of an image-capturing apparatus including zoom lenses in Example 6. In FIG. 5, the zoom lens includes, in the order from the part of an object, first lens L1, second lens L2, third lens L3, aperture stop S, fourth lens L4, fifth lens L5 and sixth lens L6 (L1–L3 constitute first lens group G1, S-L6 constitute second lens group G2 and L7 constitutes third lens group G3), and this zoom lens, optical filter F composed of an infrared cut filter arranged on the zoom lens to be closer to an object and of a lowpass filter, and solid-state image sensor IS such as CMOS or CCD constitute an image-capturing apparatus. An optical image that is formed on image-capturing surface I by passing of light through the zoom lens and filter F, and through cover glass of solid-state image sensor IS (parallel flat plate) CG is subjected to photoelectric conversion by the solid-state image sensor IS and is further subjected to prescribed processing to be converted into image signals.

Now, an acryl-based plastic lens that is formed by using the material wherein particles each having the maximum length of not more than 30 nanometers are dispersed in plastic material and has refractive index change with temperature $A=-6\times10^{-5}$ is used as the second lens L2, a polyester-based plastic lens that is formed by using the material wherein particles each having the maximum length of not more than 30 nanometers are dispersed in plastic material and has refractive index change with temperature $A=-8\times10^{-5}$ is used as the third lens L3, a polyolefin-based plastic lens that is formed by using the material wherein particles each having the maximum length of not more than 30 nanometers are dispersed in plastic material and has refractive index change with temperature $A=-8\times10^{-5}$ is used as the fifth lens L5, a polyester-based plastic lens containing no particles is used as the sixth lens L6, a polyolefin-based plastic lens containing no particles is used as the seventh lens L7 and a glass lens is used as each of lens L1 and lens L4 other than the foregoing.

In the present example, an absolute value of the product of height hi where axial marginal ray in the case of an open aperture on the surface of the plastic lens closer to an object passes and refracting power of the plastic lens Φpi is maximum in the sixth lens L6, and this sixth lens L6 is made to be a plastic lens containing no particles. Further, an absolute value of hi×Φpi at that time is 0.783.

Changes of refractive index nd by temperature changes are shown in Table 20. Further, Table 21 shows an amount of changes (ΔfBw, ΔfBT) of back focus of each of the wide-angle end and the telephoto end in the case of temperature rise of +30° C. for the normal temperature (20° C.) and an amount of changes (ΔfBw, ΔfBT) of back focus of each of the wide-angle end and the telephoto end in the case of temperature fall of −30° C.

TABLE 20

|   | A[/° C.] | Refractive index at normal temperature | Refractive index at normal temperature + 30° C. | Refractive index at normal temperature − 30° C. |
|---|---|---|---|---|
| * Second lens | $-6 \times 10^{-5}$ | 1.4970 | 1.4952 | 1.4988 |
| * Third lens | $-8 \times 10^{-5}$ | 1.6070 | 1.6046 | 1.6094 |
| * Fifth lens | $-8 \times 10^{-5}$ | 1.5250 | 1.5226 | 1.5274 |
| Sixth lens | $-14 \times 10^{-5}$ | 1.6070 | 1.6027 | 1.6113 |
| Seventh lens | $-12 \times 10^{-5}$ | 1.5250 | 1.5214 | 1.5286 |

* Plastic lens formed by using the material wherein particles whose maximum particle edge length is not more than 30 nanometers are dispersed

TABLE 21

| +30° C. | | −30° C. | |
|---|---|---|---|
| ΔfBw[mm] | ΔfBT[mm] | ΔfBw[mm] | ΔfBT[mm] |
| +0.001 | −0.007 | −0.002 | +0.007 |

Now, for the purpose of comparison, Table 22 and Table 23 show changes of refractive index nd by temperature changes in the case where all plastic lenses are made to be a plastic lens that does not contain the aforesaid particles, an amount of changes (ΔfBw, ΔfBT) of back focus of each of the wide-angle end and the telephoto end in the case of temperature rise of +30° C. for the normal temperature (20° C.), and an amount of changes (ΔfBw, ΔfBT) of back focus of each of the wide-angle end and the telephoto end in the case of temperature fall of −30° C.

TABLE 22

|   | A[/° C.] | Refractive index at normal temperature | Refractive index at normal temperature + 30° C. | Refractive index at normal temperature − 30° C. |
|---|---|---|---|---|
| Second lens | $-12 \times 10^{-5}$ | 1.4970 | 1.4934 | 1.5006 |
| Third lens | $-14 \times 10^{-5}$ | 1.6070 | 1.6027 | 1.6113 |
| Fifth lens | $-12 \times 10^{-5}$ | 1.5250 | 1.5214 | 1.5286 |
| Sixth lens | $-14 \times 10^{-5}$ | 1.6070 | 1.6027 | 1.6113 |
| Seventh lens | $-12 \times 10^{-5}$ | 1.5250 | 1.5214 | 1.5286 |

TABLE 23

| +30° C. | | −30° C. | |
|---|---|---|---|
| ΔfBw[mm] | ΔfBT[mm] | ΔfBw[mm] | ΔfBT[mm] |
| +0.045 | +0.171 | −0.047 | −0.171 |

When Table 21 is compared with Table 23, it is understood that ΔfBw and ΔfBT in the present example are reduced sharply to be controlled within a focal depth.

EXAMPLE 7

Figure 6:
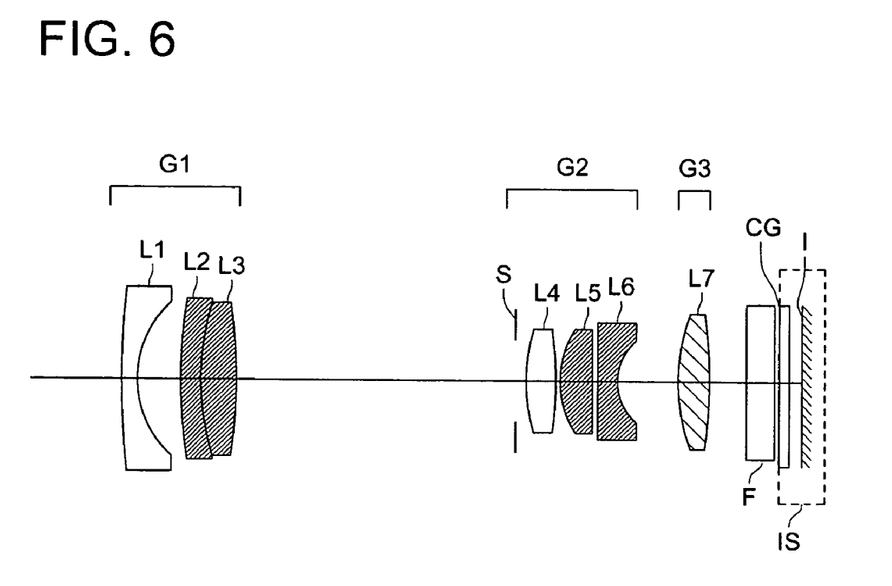
FIG. 6 is a sectional view in the optical axis direction of an image-capturing apparatus including a zoom lens in Seventh Example.

FIG. 6 is a sectional view in the optical axis direction of an image-capturing apparatus including zoom lenses in Example 7. In FIG. 6, the zoom lens includes, in the order from the part of an object, first lens L1, second lens L2, third lens L3, aperture stop S, fourth lens L4, fifth lens L5 and sixth lens L6 (L1–L3 constitute first lens group G1, S-L6 constitute second lens group G2 and L7 constitutes third lens group G3), and this zoom lens, optical filter F composed of an infrared cut filter arranged on the zoom lens to be closer to an object and of a lowpass filter, and solid-state image sensor IS such as CMOS or CCD constitute an image-capturing apparatus. An optical image that is formed on image-capturing surface I by passing of light through the zoom lens and filter F, and through cover glass of solid-state image sensor IS (parallel flat plate) CG is subjected to photoelectric conversion by the solid-state image sensor IS and is further subjected to prescribed processing to be converted into image signals.

A form and an arrangement of each optical factor in the zoom lens in Example 7 are exactly the same as those in Example 6 (see FIG. 5), and lens data thereof are the same as those shown in Table 19. However, a material of a plastic lens formed by using the material wherein particles each having the maximum length of not more than 30 nanometers are dispersed in plastic material (sixth lens L6) is different.

More specifically, an acryl-based plastic lens that is formed by using the material wherein particles each having the maximum length of not more than 30 nanometers are dispersed in plastic material and has refractive index change with temperature $A=-8\times10^{-5}$ is used as the second lens L2, a polyester-based plastic lens that is formed by using the material wherein particles each having the maximum length of not more than 30 nanometers are dispersed in plastic material and has refractive index change with temperature $A=-4\times10^{-5}$ is used as the third lens L3, a polyolefin-based plastic lens that is formed by using the material wherein particles each having the maximum length of not more than 30 nanometers are dispersed in plastic material and has refractive index change with temperature $A=-4\times10^{-5}$ is used as the fifth lens L5, a polyester-based plastic lens that is formed by using the material wherein particles each having the maximum length of not more than 30 nanometers are dispersed in plastic material and has refractive index change with temperature $A=-6\times10^{-5}$ is used as the sixth lens L6, an polyolefin-based plastic lens containing no particles is used as the seventh lens L7, and a glass lens is used as each of lens L1 and lens L4 other than the foregoing.

In the present example, an absolute value of the product of height hi where axial marginal ray in the case of an open aperture on the surface of the plastic lens closer to an object passes and refracting power of the plastic lens Φpi is maximum in the sixth lens L6, and this sixth lens L6 is made to be a plastic lens formed by using the material wherein particles each having the maximum length of not more than 30 nanometers are dispersed in plastic material. Further, an absolute value of hi×Φpi at that time is 0.783.

Changes of refractive index nd by temperature changes are shown in Table 24. Further, Table 25 shows an amount of changes (ΔfBw, ΔfBT) of back focus of each of the wide-angle end and the telephoto end in the case of temperature rise of +30° C. for the normal temperature (20° C.) and an amount of changes (ΔfBw, ΔfBT) of back focus of each of the wide-angle end and the telephoto end in the case of temperature fall of −30° C.

TABLE 24

|  | A[/° C.] | Refractive index at normal temperature | Refractive index at normal temperature + 30° C. | Refractive index at normal temperature − 30° C. |
|---|---|---|---|---|
| * Second lens | −8 × 10⁻⁵ | 1.4970 | 1.4946 | 1.4994 |
| * Third lens | −4 × 10⁻⁵ | 1.6070 | 1.6058 | 1.6082 |
| * Fifth lens | −4 × 10⁻⁵ | 1.5250 | 1.5238 | 1.5262 |
| * Sixth lens | −6 × 10⁻⁵ | 1.6070 | 1.6052 | 1.6088 |
| Seventh lens | −12 × 10⁻⁵ | 1.5250 | 1.5214 | 1.5286 |

* Plastic lens formed by using the material wherein particles whose maximum particle edge length is not more than 30 nanometers are dispersed

TABLE 25

| +30° C. | | −30° C. | |
|---|---|---|---|
| ΔfBw[mm] | ΔfBT[mm] | ΔfBw[mm] | ΔfBT[mm] |
| +0.008 | +0.002 | −0.010 | −0.002 |

When Table 23 is compared with Table 25, it is understood that ΔfBw and ΔfBT in the present example are reduced sharply to be controlled within a focal depth.

In this case, the amount of changes (ΔfBw, ΔfBT) of back focus in the case of temperature rise is a value obtained by disregarding an influence of thermal expansion of the plastic lens in the case of temperature rise and an influence of thermal expansion of a lens barrel that holds the lens on the basis of calculation. The reason for the foregoing is that fluctuations in image point position in the case of temperature changes are mainly resulted from changes in the refractive index of the plastic lens.

If a value of A of the first lens is made to be one that cancels the fluctuations of image point positions of the total system including also thermal expansions of the lens barrel and of plastic lenses, such structure is more preferable. Further, all plastic lenses can naturally be formed by using the material wherein particles whose maximum particle edge length is not more than 30 nanometers are dispersed in plastic material.

The invention has so far been explained, referring to the embodiments to which, however, the invention is not limited, and modification and improvement can naturally be made. An image-capturing apparatus of the invention is preferably housed in a small-sized digital still camera and in a mobile terminal such as a cellphone and PDA, and it can also be used for other application such as a personal computer camera.

What is claimed is:

1. An image-capturing lens, comprising:
a plastic lens formed with use of a material in which particles each having the maximum length of 30 nanometer or less are dispersed in a plastic material, wherein the plastic lens satisfies the following formula:

$$|A| \leq 8\times10^{-5}/°C.$$

where A represents a change of refractive index caused by a temperature change which is expressed by the following expression:

$$A = \frac{(n^2+2)(n^2-1)}{6n}\left\{\left(-3\alpha + \frac{1}{[R]}\frac{\partial[R]}{\partial t}\right)\right\}$$

α: Coefficient of linear expansion, [R]: Molecular refraction.

2. The image-capturing lens of claim 1, wherein the plastic lens formed with use of a material in which particles each having the maximum length of 30 nanometer or less are dispersed in a plastic material is a positive plastic lens.

3. The image-capturing lens of claim 1, wherein the image-capturing lens comprises at least two lenses.

4. The image-capturing lens of claim 1, wherein the image-capturing lens comprises at least two lenses and a plastic lens having the strongest refractive power among the at least two lenses is the plastic lens formed with use of a material in which particles each having the maximum length of 30 nanometer or less are dispersed in a plastic material.

5. The image-capturing lens of claim 1, wherein the image-capturing lens comprises a positive plastic lens and a negative plastic lens and the positive plastic is the plastic lens formed with use of a material in which particles each having the maximum length of 30 nanometer or less are dispersed in a plastic material.

6. The image-capturing lens of claim 1, wherein the image-capturing lens is totally composed of plastic lenses and at least one of the plastic lenses is the plastic lens formed with use of a material in which particles each having the maximum length of 30 nanometer or less are dispersed in a plastic material.

7. The image-capturing lens of claim 1, wherein the image-capturing lens comprises at least one glass lens.

8. The image-capturing lens of claim 1, wherein an aperture stop is provided and at least one of a plastic lens that is closest to the aperture stop among plastic lenses and a plastic lens that is further adjacent to the plastic lens that is closest to the aperture stop is the plastic lens formed with use of a material in which particles each having the maximum length of 30 nanometer or less are dispersed in a plastic material.

9. The image-capturing lens of claim 1, wherein the plastic lens formed with use of a material in which particles each having the maximum length of 30 nanometer or less satisfies the following formula:

$$|A| < 6 \times 10^{-5} / °C.$$

10. The image-capturing lens of claim 1, wherein the particles are inorganic materials.

11. The image-capturing lens of claim 10, wherein the inorganic materials are oxides.

12. The image-capturing lens of claim 11, wherein the oxides are in the state of saturated oxidation.

13. The image-capturing lens of claim 1, wherein a volume ratio between the plastic material and the particles dispersed in the plastic material is within a range of 9:1–3:2.

14. An image capturing apparatus, comprising:
the image-capturing lens described in claim 1.

15. A zoom lens, comprising:
plural lens groups, wherein magnification is varied by changing a distance between the lens groups;
wherein the zoom lens includes at least one plastic lens,
wherein when $h_i(i=1, \ldots)$ represents a height at which a paraxial marginal ray of light in the case of full aperture passes on the surface of each plastic lens on the object side and $\Phi_p i(i=1, \ldots)$ represents the refracting power of each plastic lens, the plastic lens having a highest absolute value of $h_i \times \Phi_p i(i=1, \ldots)$ in an optional focal length in the case of magnification change from the wide-angle end to the telephoto end in the optional focal length, is formed with use of a material in which particles each having the maximum length of 30 nanometer or less are dispersed in a plastic material.

16. The zoom lens of claim 15, wherein the first lens group of the zoom lens closest to an object in the zoom lens comprises at least one plastic lens which is the plastic lens formed with use of a material in which particles each having the maximum length of 30 nanometer or less are dispersed in a plastic material.

17. The zoom lens of claim 15, wherein the zoom lens comprises at least two plastic lenses each being formed with use of the material wherein particles each having the maximum length of not more than 30 nanometers are dispersed in plastic material and the plastic lenses formed with use of the material include plastic lenses each having a different value A of refractive index change with temperature.

18. An image-capturing lens, comprising:
a plastic lens formed with use of a material in which particles each having the maximum length of 30 nanometer or less are dispersed in a plastic material,
wherein a volume ratio between the plastic material and the particles dispersed in the plastic material is within a range of 9:1–3:2.

* * * * *